US006608627B1

(12) United States Patent
Marshall et al.

(10) Patent No.: US 6,608,627 B1
(45) Date of Patent: Aug. 19, 2003

(54) RENDERING A TWO-DIMENSIONAL IMAGE (75) Inventors: Carl S. Marshall, Portland, OR (US); Adam T. Lake, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/411,680

(22) Filed: Oct. 4, 1999

(51) Int. Cl.[7] .............................................. G06T 15/00
(52) U.S. Cl. ..................................................... 345/619
(58) Field of Search ................................ 345/423, 419, 345/420, 428, 619

(56) References Cited

U.S. PATENT DOCUMENTS 6,115,050 A * 9/2000 Landau et al. ............... 345/433

OTHER PUBLICATIONS

Foley, Computer Graphics Principles and Practice, 1995, Addison–Wesley, 2nd Edition, chapter 15.2.4, p. 663–664.*
Markosian, Lee et al. Real–Time Nonphotorealistic Rendering. Siggarph 1998.
Appel, Arthur. "The Notion of Quantitative Invisibility and the Machine Rendering of Solids." Proceedings of 22nd National Conference Association for Computing Machinery 1967.
Zeleznik, Robert C. "SKETCH: An Interface for Sketching 3D Scences." Computer Graphics Proceedings 1996.

* cited by examiner

Primary Examiner—Phu K. Nguyen
(74) Attorney, Agent, or Firm—Fish & Richardson P.C.

(57) ABSTRACT

A two-dimensional image is rendered from data for a three-dimensional model by detecting silhouette features on the three-dimensional model based on the data, and rendering polygons and the silhouette features to produce the two-dimensional image. The silhouette features are detected by detecting edges of polygons that make up the three-dimensional model, storing coordinates of detected polygon edges in an edge list, determining which of the detected polygon edges are silhouette edges, and marking, in the edge list, detected polygon edges that are silhouette edges.

57 Claims, 8 Drawing Sheets

RENDERING A TWO-DIMENSIONAL IMAGE

BACKGROUND OF THE INVENTION

This invention relates to rendering a two-dimensional ("2D") image from data for a three-dimensional ("3D") model.

There are different types of 2D images. For example, gouraud-shaded 2D images are shaded in a way to simulate real-world photorealistic lighting. By contrast, one style of non-photorealistic 2D images are "flat", cartoon-like images. In traditional animation, such images are drawn on cels, often by hand. Each time a new perspective of a 3D model is required, an entirely new image is redrawn on a new cel. Recently, animators have begun to use computers to render non-photorealistic 2D images.

SUMMARY OF THE INVENTION

In general, in one aspect of the invention, a 2D image is rendered from data for a 3D model by detecting silhouette features on the 3D model, and rendering the silhouette features to produce the 2D image.

Among the advantages of the invention are one or more of the following. 2D images, such as nonphotorealistic images, can be rendered for any position and view of the 3D model. Therefore, once data has been generated for the 3D model, the same 3D data can be used to produce any number of 2D images. For example, the 3D model can be positioned, and a 2D image rendered for that position. The same 3D model can then be repositioned, and a new 2D image rendered for the new position, using the same 3D data. A hash table may be used during load-time of a model to decrease the amount of time it takes to find edges of the model, and thus decrease processing time overall.

Other advantages and features will become apparent from the following description and the claims.

DESCRIPTION

Figure 1:
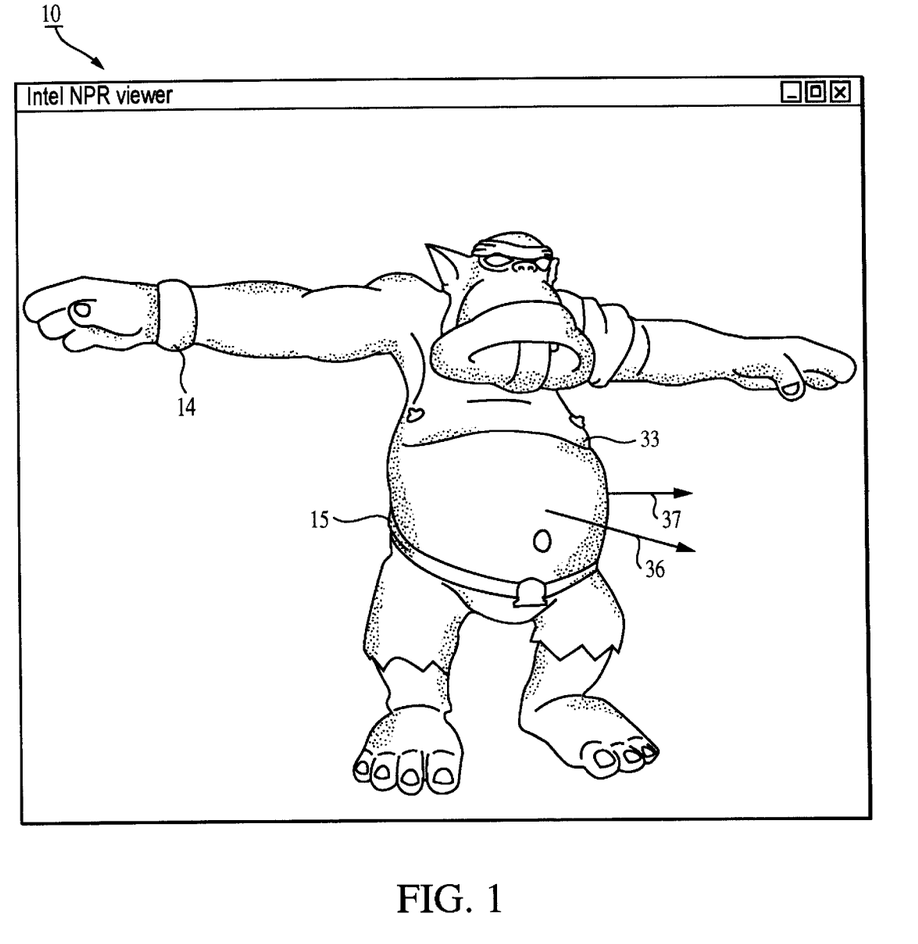
FIG. 1 is a view of a gouraud shaded 2D representation of a 3D model.
Figure 2:
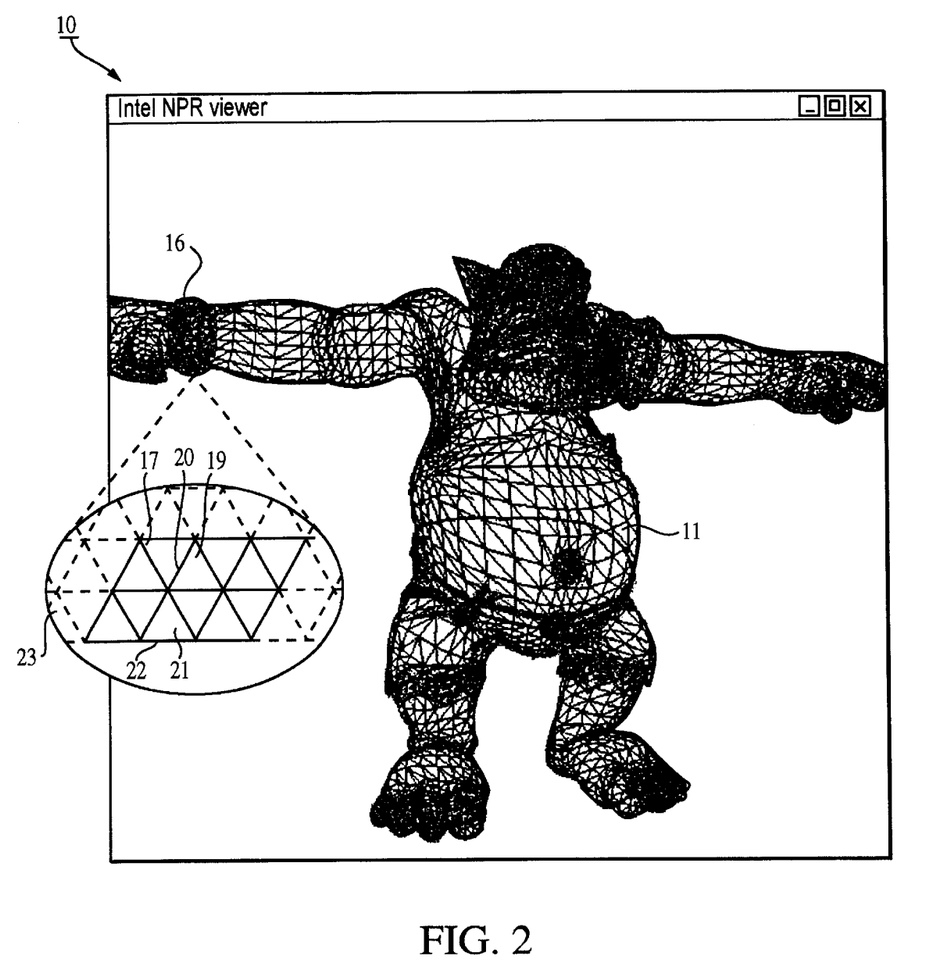
FIG. 2 is a view of polygons in the 3D model.

This embodiment renders 2D images from data for 3D models. The 3D model 10 of FIG. 1 is comprised of interconnecting polygons 11 (FIG. 2). Polygons 11 are triangles; however, other types of polygons may be used. Groups of polygons are organized into meshes, each of which corresponds to an element of the 3D model. For example, arm band 14 and belt 15 (FIG. 1) each correspond to a different mesh. Within a mesh, adjacent polygons share common features. For example, in an arm band mesh 16 (FIG. 2), polygons 17 and 19 share a common edge 20 (see close-up view 23). Polygons on the perimeter of a mesh, such as polygon 21, have at least one unshared edge 22.

Figure 3:
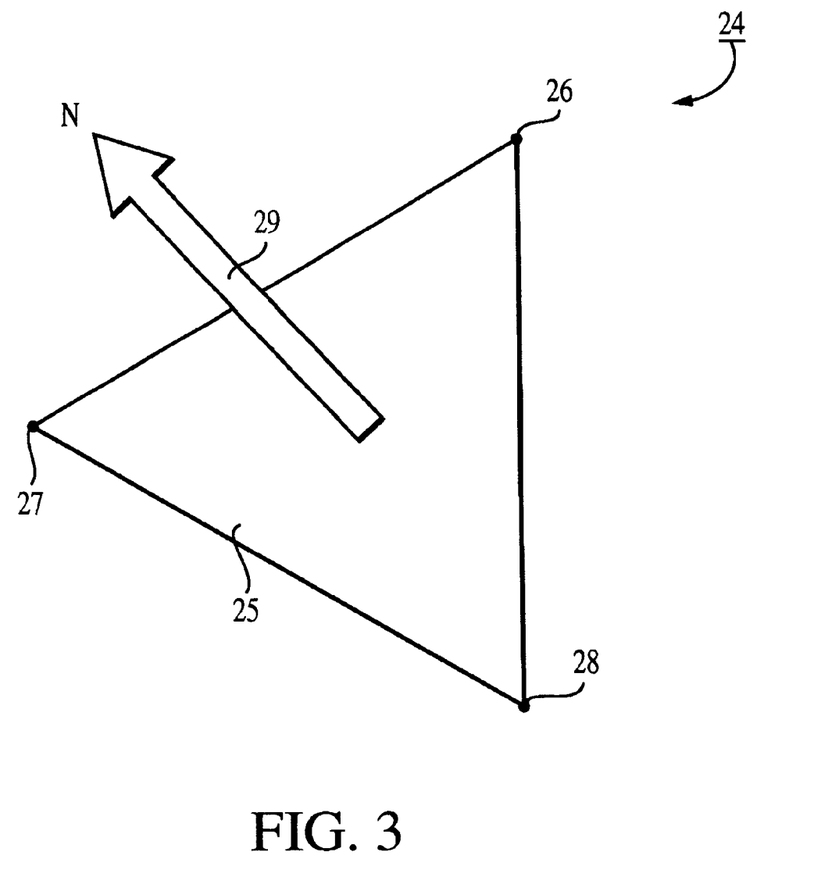
FIG. 3 is a view of one of the polygons.

The 3D data for each triangular polygon is comprised of three vertices positioned in (x,y,z) coordinate space. These vertices define a face or polygon. The 3D data also includes a normal vector to each face, which is also positioned in (x,y,z) coordinate space. For example, in FIG. 3, polygon 24 includes face 25, vertices 26, 27 and 28, and normal vector ("N") 29. This 3D data is used in the following non-photorealistic rendering ("NPR") process to produce 2D images.

Figure 4:
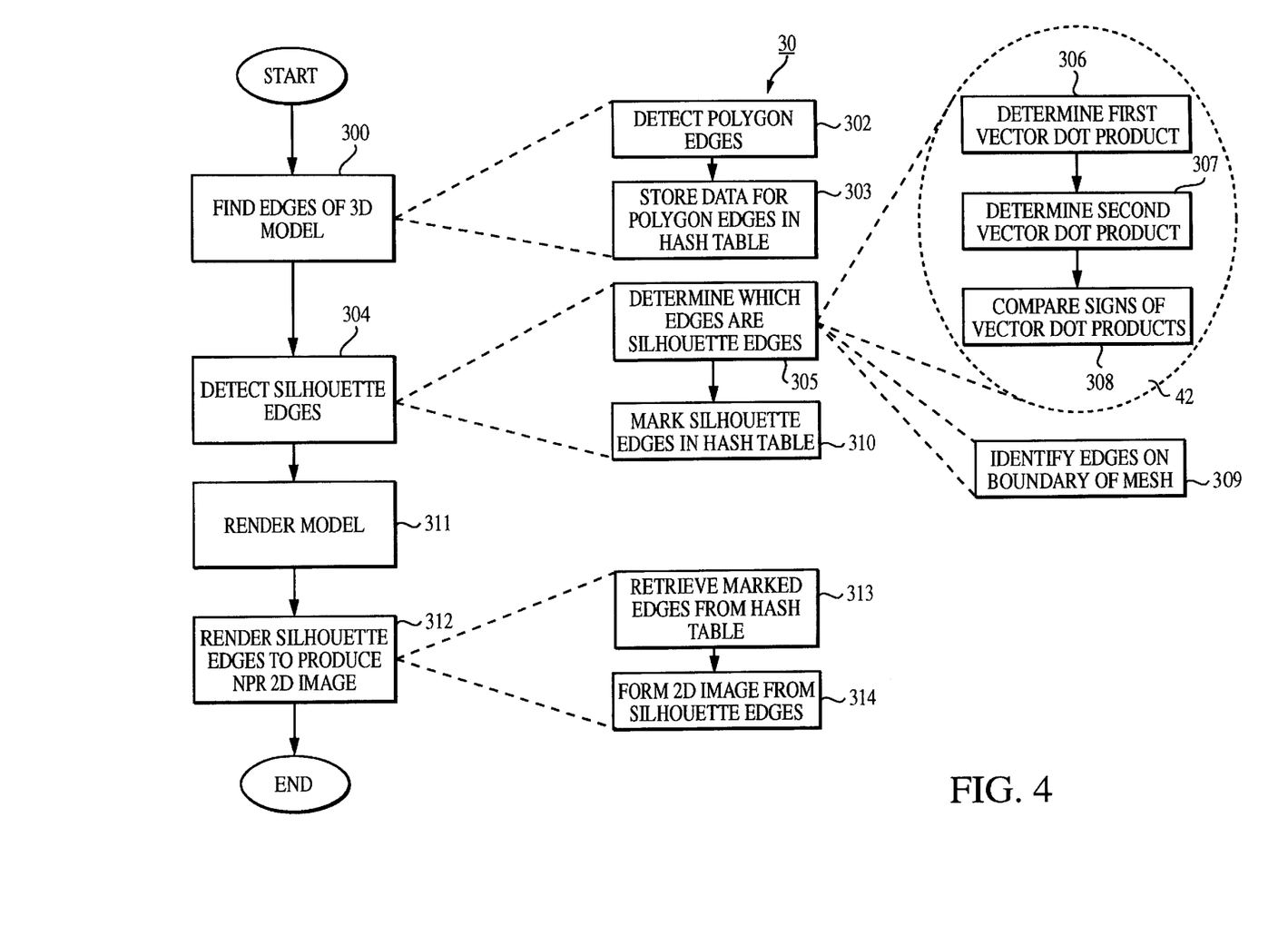
FIG. 4 is a flowchart showing a process for rendering a 2D image from data for the polygons in accordance with one embodiment of the invention.

Referring to FIG. 4, the 2D image rendering process 30 begins by finding (300) edges of a 3D model. This is done by detecting (301) each edge in polygons that make up 3D model 10 (FIGS. 1 and 2). This is done by examining the face of the polygon and extracting the edge coordinates of the face based on its vertices. The extracted edge coordinates are stored (302) in an edge list in a hash table. Vertices of the edges are used as keys to the hash table. The keys are determined by adding coordinates for the vertices of an edge, and dividing the resulting sum by the total size of the hash table. The remainder (or "Mod") of the resulting quotient is used as the key to access each edge in the hash table. Although a hash table is used to implement the edge list in this embodiment, any type of edge list may be used.

Process 30 detects (304) silhouette edges from the edge list. This is done by determining (305) which edges in the hash table are silhouette edges. Generally, silhouette edges are outlines of meshes of an image. Two types of silhouette edges are detected by process 30. One type of silhouette edge is a common edge shared by two polygon faces—a "front" face and a "back" face. This type of silhouette edge defines a transition point between the front and back of an image (or portion of an image, such as flesh folds 33 in image 10 (FIG. 1)) relative to a preset point on a display screen. An eyepoint vector is used to determine whether a polygon face is front-facing or back facing. The eyepoint vector is the vector from the preset point (the eyepoint) to the face of a target polygon. An eyepoint vector 36 and a normal vector 37 are shown in FIG. 1.

Figure 5:
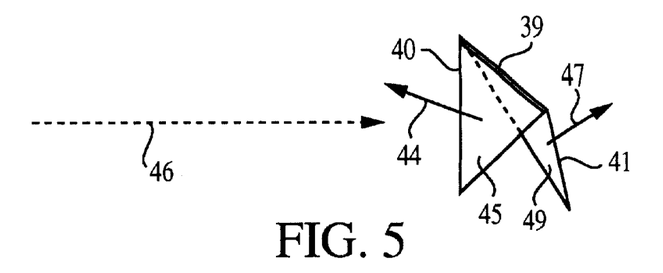
FIG. 5 is a perspective view of polygons which illustrates how silhouette edges are detected.

To determine whether an edge 39 shared by two polygons 40 and 41 (FIG. 5) is a silhouette edge, process 30 executes the steps of block 42. Process 30 determines (306) the vector dot product of normal vector 44 (to polygon face 45) and eyepoint vector 46. Process 30 determines (307) the vector dot product of normal vector 47 (to polygon face 49) and eyepoint vector 46. The signs of the resulting dot products are then compared (308). If the signs are the same, this means that at least a portion of each of polygon faces 47 and 49 can be viewed from the preset point on the screen. If this were the case, edge 39 would not be a silhouette edge.! If the signs are different, the two polygon faces 45 and 49 are facing in different directions, meaning that one of the polygon faces cannot be viewed from the preset point. This is the case in FIG. 5; therefore, edge 39 is a silhouette edge.

Figure 6:
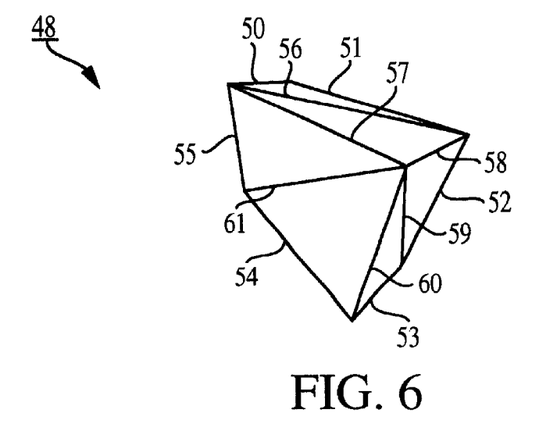
FIG. 6 is a view of adjacent polygons.

Referring to FIG. 6, edges 50, 51, 52, 53, 54 and 55 of image 48 are silhouette edges since they are shared with polygons that cannot be seen from a preset point (for example, 90° to the page showing FIG. 6). Edges 56, 57, 58, 59, 60 and 61 are not silhouette edges, since they are shared by polygons that can be seen, at least in part, from the preset point.

Another type of silhouette edge is found on a boundary of a mesh. This type of silhouette edge is not shared with an adjacent polygon. For example, in FIG. 1, polygons on the perimeters of arm band 14 and belt 15 contain at least one edge that is not shared with an adjacent polygon in the same mesh (though such an edge may share a polygon of another mesh). To detect this type of silhouette edge, process 30 detects (309) edges in a mesh that are not shared with an adjacent polygon in the same mesh. Detecting (309) can be performed by comparing vertices of polygon edges to determine if the same vertices are used in two different polygons.

Once a silhouette edge has been detected, it is marked (310) in the hash table containing the list of all edges. This may be done after each silhouette edge is detected, or all silhouette edges in a model may be detected and then marked. The silhouette edges are marked with a boolean flag; however, other markings may be used.

Figure 7:
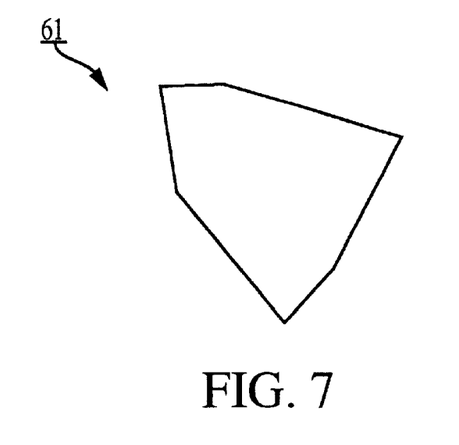
FIG. 7 is a silhouette of the adjacent polygons.
Figure 8:
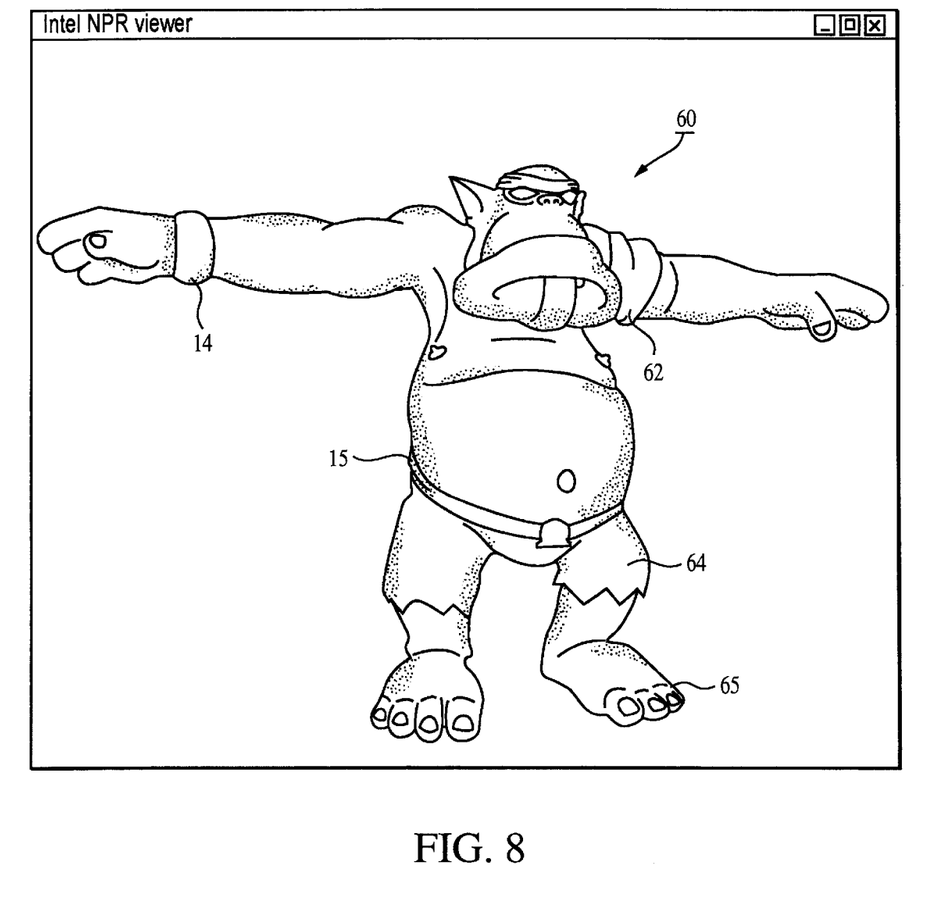
FIG. 8 is a 2D image rendered from silhouette edges on the 3D model.

Process 30 renders (311) the 3D model in its current position, and renders (312) an NPR 2D image from the silhouette edges marked in the hash table for the current position. Rendering in 312 is performed by retrieving (313) marked edges from the hash table and forming (314) an NPR 2D image from the retrieved and marked edges. FIG. 7 shows an NPR 2D image 61 that is rendered via process 30 for image 48 (FIG. 6); and FIG. 8 shows an NPR 2D image 60 that is rendered via process 30 for image 10 (FIG. 1). The shading shown in belt 15, arm bands 14 and 62, shorts 64, and toenails 65 is used to further differentiate the various mesh areas, and is not produced by process 30.

Process 30 may be used to create cartoon images for animation. For example, a 3D model, such as model 10, may be generated, and then positioned in any desired manner. Process 30 may be executed on the model to produce an NPR 2D image for that position. Then, the 3D model 10 can be re-positioned (e.g., rotated), and 304 to 314 of process 30 executed on-the re-positioned model to produce-an NPR 2D image for the new position. This may be repeated to produce NPR 2D images for any number of positions. In this way, process 30 is used to generate animation cels automatically.

Figure 9:
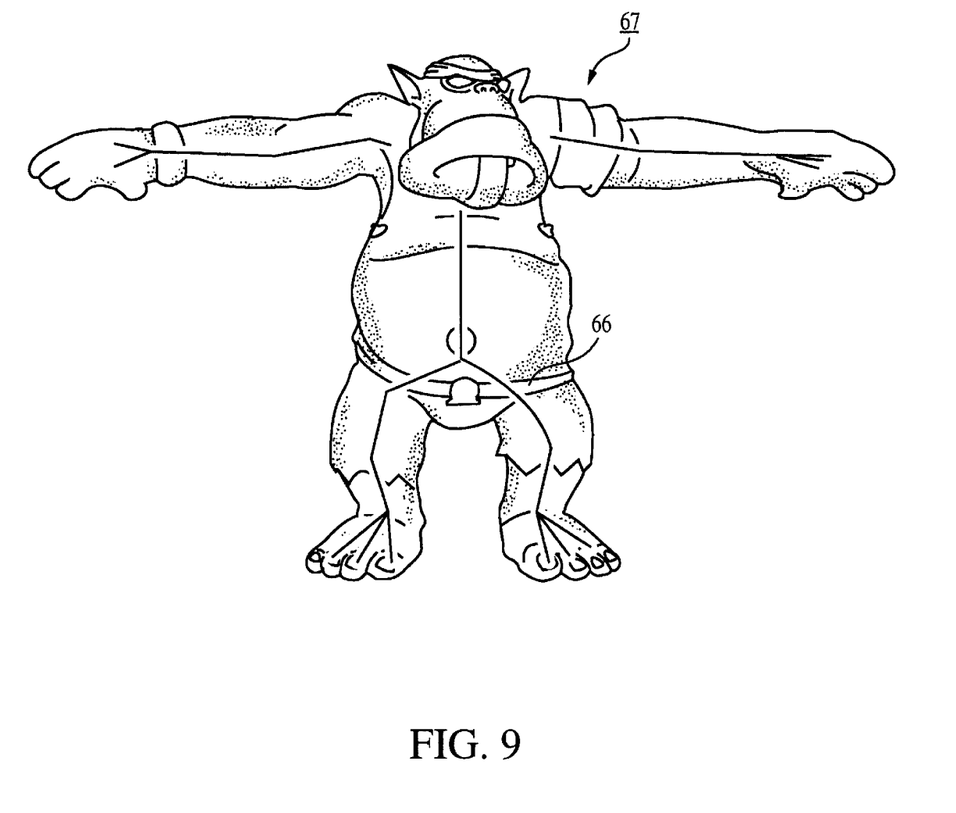
FIG. 9 is a view of a 2D image which includes an internal bone structure.

Also, process 30 can be performed to facilitate a 3D animation process. In 3D animation, a character is assigned a "bone" structure, similar to simplified skeletal structures of living beings, which controls (and limits) how the character moves. It is difficult to see this bone structure when characters are viewed as meshes of connected polygons (see FIG. 2). This makes it difficult for 3D animators to manipulate the image. However, if process 30 is performed, it is easy to see the bone structure in the resulting NPR 2D image. For example, in FIG. 9, "bones" 66 are clearly visible in NPR 2D image 67.

Process 30 is performed in 3D space, meaning that is performed using 3D data. By processing data in 3D space (as opposed to 2D space), rendering can be performed using graphics accelerator cards of a personal computer.

Figure 10:
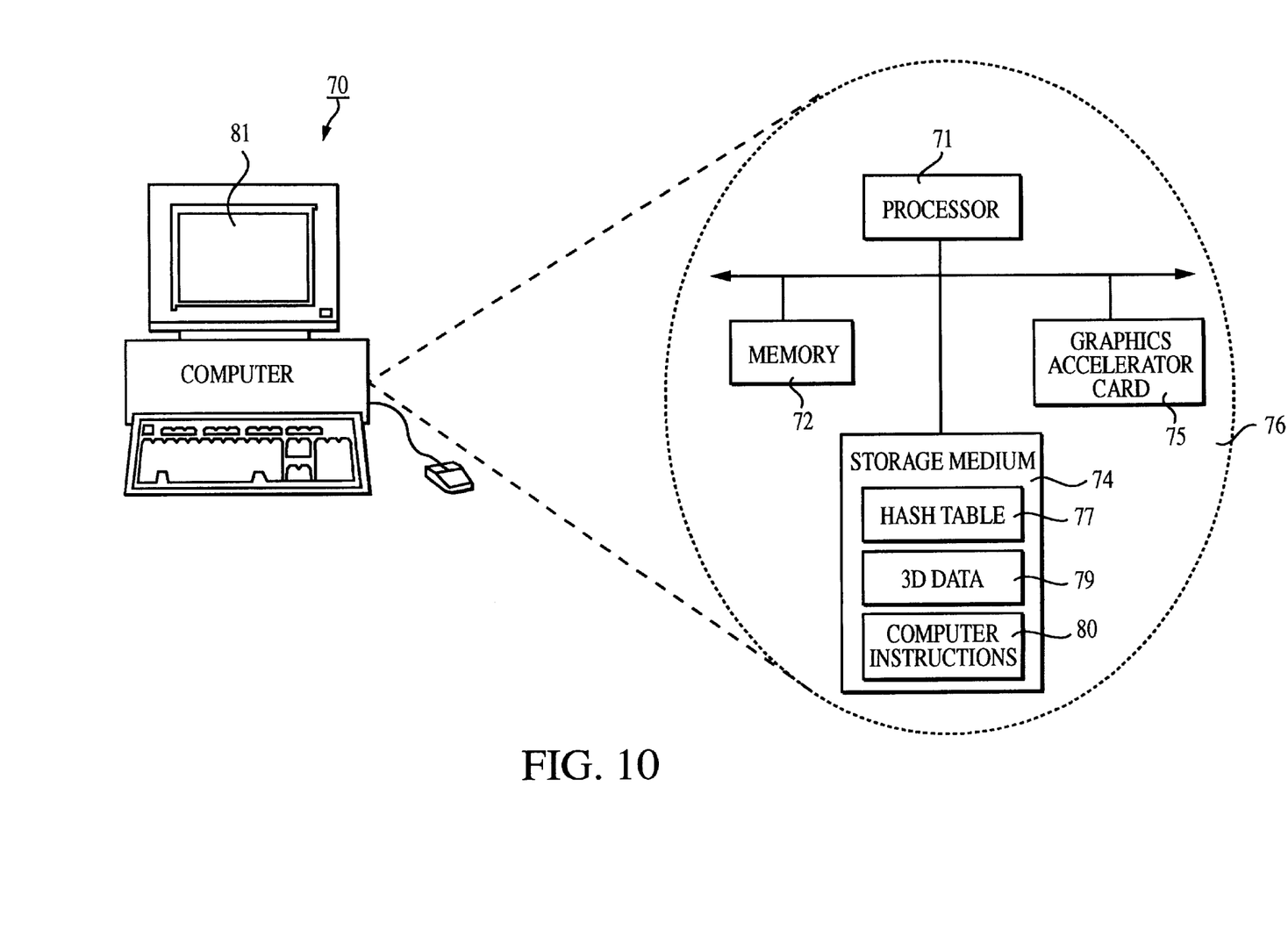
FIG. 10 is a view of a computer system on which the process of FIG. 4 may be implemented.

FIG. 10 shows a computer 70 for rendering 2D images using process 30. Computer 70 includes a processor 71, a memory 72, a storage medium 74 (e.g., a hard disk), and a 3D graphics accelerator card 75 for repositioning a 3D model and manipulating 3D data (see view 76). Storage medium 74 stores hash table 77 containing the edge list described above, 3D data 79, and computer instructions 80 for rendering NPR 2D images via process 30.

Process 30, however, is not limited to use with any particular hardware or software configuration; it may find applicability in any computing or processing environment. Process 30 may be implemented in hardware, software, or a combination of the two. Process 30 may be implemented in computer programs executing on programmable computers that each include a processor, a storage medium readable by the processor (including volatile and non-volatile memory and/or storage elements), at least one input device, and one or more output devices. Program code may be applied to data entered using an input device to perform process 30 and to generate output information. The output information may be applied to one or more output devices, such as display screen 81 of FIG. 10.

Each such program may be implemented in a high level procedural or object-oriented programming language to communicate with a computer system. However, the programs can be implemented in assembly or machine language. The language may be a compiled or an interpreted language.

Each computer program may be stored on a storage medium or device (e.g., CD-ROM, hard disk, or magnetic diskette) that is readable by a general or special purpose programmable computer for configuring and operating the computer when the storage medium or device is read by the computer to perform process 30. Process 30 may also be implemented as a computer-readable storage medium, configured with a computer program, where, upon execution, instructions in the computer program cause the computer to operate in accordance with process 30.

Other embodiments not described herein are also within the scope of the following claims.

What is claimed is:

1. A method of rendering a two-dimensional image from data for a three-dimensional model, comprising:
   detecting silhouette features on the three-dimensional model based on the data, the silhouette features comprising edges between front-facing and back-facing polygons in the three-dimensional model, at least some of the silhouette features being detected using data for both the front-facing and back-facing polygons; and
   rendering only the silhouette features as edge segments to produce a nonphotorealistic two-dimensional silhouette image.

2. The method of claim 1, wherein:
   the data comprises normal vectors of polygons; and
   the detecting comprises a vector computation with respect to the normal vectors.

3. The method of claim 1, wherein
   the data comprises polygons that make up the three-dimensional model; and
   detecting the silhouette feature comprises:
      determining a first vector dot product of an eyepoint vector and a normal vector to a first polygon;
      determining a second vector dot product of the eyepoint vector and a normal vector to a second polygon; and
      comparing signs of the first vector dot product and the second vector dot product.

4. The method of claim 3, wherein a feature is a silhouette feature if the signs are different, and the feature is not a silhouette feature if the signs are the same.

5. The method of claim 1, wherein a set of polygons comprises a mesh, and a silhouette feature comprises an edge of a polygon that is on a boundary of the mesh.

6. The method of claim 5, wherein the silhouette feature at the boundary of the mesh comprises an edge that is not shared with an adjacent polygon.

7. The method of claim 1, wherein the polygons comprise triangles.

8. The method of claim 1, wherein rendering is performed using an edge list.

9. The method of claim 8, wherein:

the data comprises polygons that make up the three-dimensional model; and detecting silhouette features comprises:
  detecting edges of the polygons;
  storing coordinates of detected polygon edges in an edge list;
  determining which of the detected polygon edges are silhouette edges; and
  marking, in the edge list, detected polygon edges that are silhouette edges.

10. The method of claim 9, wherein rendering comprises:

retrieving marked edges from the edge list; and forming the two-dimensional image based on the marked edges.

11. The method of claim 1, further comprising rendering a skeletal structure of the three-dimensional model along with the silhouette image, the skeletal structure being internal to the silhouette image.

12. An article comprising a machine-readable medium that stores instructions for rendering a two-dimensional image from data for a three-dimensional model, the instructions for causing a machine to:

detect silhouette features on the three-dimensional model based on the data, the silhouette features comprising edges between front-facing and back-facing polygons in the three-dimensional model, at least some of the silhouette features being detected using data for both the front-facing and back-facing polygons; and render only the silhouette features as edge segments to produce a nonphotorealistic two-dimensional silhouette image.

13. The article of claim 12, wherein:

the data comprises normal vectors of polygons; and the detecting comprises a vector computation with respect to the normal vectors.

14. The article of claim 12, wherein:

the data comprises polygons that make up the three-dimensional model; and detecting the silhouette feature comprises:
  determining a first vector dot product of an eyepoint vector and a normal vector to a first polygon;
  determining a second vector dot product of the eyepoint vector and a normal vector to a second polygon; and
  comparing signs of the first vector dot product and the second vector dot product.

15. The article of claim 12, wherein a set of polygons comprises a mesh, and a silhouette feature comprises an edge of a polygon that is on a boundary of the mesh.

16. The article of claim 15, wherein the silhouette feature at the boundary of the mesh comprises an edge that is not shared with an adjacent polygon.

17. The article of claim 12, wherein:

rendering is performed using an edge list;

the data comprises polygons that make up the three-dimensional model; and detecting silhouette features comprises:
  detecting edges of the polygons;
  storing coordinates of detected polygon edges in the edge list;
  determining which of the detected polygon edges are silhouette edges; and
  marking, in the edge list, detected polygon edges that are silhouette edges.

18. The article of claim 17, wherein rendering comprises:

retrieving marked edges from the edge list; and forming the two-dimensional image based on the marked edges.

19. The article of claim 12, further comprising instructions to render a skeletal structure of the three-dimensional model along with the silhouette image, the skeletal structure being internal to the silhouette image.

20. An apparatus for rendering a two-dimensional image from data for a three-dimensional model, comprising:

a memory which stores instructions; and a processor which executes the instructions to (i) detect silhouette features on the three-dimensional model based on the data, the silhouette features comprising edges between front-facing and back-facing polygons in the three-dimensional model, at least some of the silhouette features being detected using data for both the front-facing and back-facing polygons, and (ii) render only the silhouette features as edge segments to produce a nonphotorealistic two-dimensional silhouette image.

21. The apparatus of claim 20, wherein the processor renders a-skeletal structure of the three-dimensional model along with the silhouette image, the skeletal structure being internal to the silhouette image.

22. A method of rendering a two-dimensional cartoon image from data for a three-dimensional model, comprising:

positioning the three-dimensional model;

detecting silhouette edges on the three-dimensional model based on the data, the silhouette edges comprising edges between front-facing and back-facing polygons in the three-dimensional model, at least some of the silhouette edges being detected using data for both the front-facing and back-facing polygons; and rendering only the silhouette edges as edge segments to produce a silhouette image comprising a nonphotorealistic two-dimensional cartoon image.

23. The method of claim 22, wherein:

the data comprises normal vectors of polygons; and detecting comprises a vector computation with respect to the normal vectors.

24. The method of claim 22, wherein the data comprises polygons that make up the three-dimensional model; and detecting a silhouette edge comprises:
  determining a first vector dot product of an eyepoint vector and a normal vector to a first polygon;
  determining a second vector dot product of the eyepoint vector and a normal vector to a second polygon; and
  comparing signs of the first vector dot product and the second vector dot product.

25. The method of claim 24, wherein a feature is a silhouette edge if the signs are different, and the feature is not a silhouette edge if the signs are the same.

26. The method of claim 22, wherein a set of polygons comprises a mesh, and a silhouette edge comprises an edge of a polygon that is on a boundary of the mesh.

27. The method of claim 26, wherein a silhouette edge at the boundary of the mesh comprises an edge that is not shared with an adjacent polygon.

28. The method of claim 22, wherein the polygons comprise triangles.

29. The method of claim 22, wherein rendering is performed using an edge list.

30. The method of claim 29, wherein:

the data comprises polygons that make up the three-dimensional model; and detecting silhouette edges comprises:
  detecting edges of the polygons;
  storing coordinates of detected polygon edges in an edge list;
  determining which of the detected polygon edges are silhouette edges; and
  marking, in the edge list, detected polygon edges that are silhouette edges.

31. The method of claim 30, wherein rendering comprises:
  retrieving marked edges from the edge list; and
  forming the non-photorealistic two-dimensional cartoon image based on the marked edges.

32. The method of claim 22, further comprising:
  rendering a skeletal structure of the three-dimensional model, the skeletal structure being internal to the cartoon image.

33. The method of claim 22, further comprising:
  re-positioning the three-dimensional model to produce a re-positioned three-dimensional model;
  detecting silhouette edges on the re-positioned three-dimensional model based on the data, the silhouette edges comprising edges between front-facing and back-facing polygons in the three-dimensional model and edges on boundaries of the three-dimensional model that do not connect to a neighboring polygon; and
  rendering only the silhouette edges of the re-positioned three-dimensional model as edge segments to produce a silhouette image comprising a nonphotorealistic two-dimensional cartoon image.

34. An article comprising a machine-readable medium that stores instructions for rendering a two-dimensional image from data for a three-dimensional model, the instructions for causing a machine to:
  position the three-dimensional model;
  detect silhouette edges on the three-dimensional model based on the data, the silhouette edges comprising edges between front-facing and back-facing polygons in the three-dimensional model, at least some of the silhouette edges being detected using data for both the front-facing and back-facing polygons; and
  render only the silhouette edges as edge segments to produce a silhouette image comprising a nonphotorealistic two-dimensional cartoon image.

35. The article of claim 34, wherein:
  the data comprises normal vectors of polygons; and
  detecting comprises a vector computation with respect to the normal vectors.

36. The article of claim 34, wherein
  the data comprises polygons that make up the three-dimensional model; and
  detecting a silhouette edge comprises:
    determining a first vector dot product of an eyepoint vector and a normal vector to a first polygon;
    determining a second vector dot product of the eyepoint vector and a normal vector to a second polygon; and
    comparing signs of the first vector dot product and the second vector dot product.

37. The article of claim 36, wherein a feature is a silhouette edge if the signs are different, and the feature is not a silhouette edge if the signs are the same.

38. The article of claim 34, wherein a set of polygons comprises a mesh, and a silhoutte edge comprises an edge of a polygon that is on a boundary of the mesh.

39. The article of claim 38, wherein a silhouette edge at the boundary of the mesh comprises an edge that is not shared with an adjacent polygon.

40. The article of claim 34, wherein the polygons comprise triangles.

41. The article of claim 34, wherein rendering is performed using an edge list.

42. The article of claim 41, wherein:
  the data comprises polygons that make up the three-dimensional model; and
  detecting silhouette edges comprises:
    detecting edges of the polygons;
    storing coordinates of detected polygon edges in an edge list;
    determining which of the detected polygon edges are silhouette edges; and
    marking, in the edge list, detected polygon edges that are silhouette edges.

43. The article of claim 42, wherein rendering comprises:
  retrieving marked edges from the edge list; and
  forming the non-photorealistic two-dimensional cartoon image based on the marked edges.

44. The article of claim 34 further comprising instructions that cause the machine to:
  render a skeletal structure of the three-dimensional model, the skeletal structure being internal to the cartoon image.

45. The article of claim 34, further comprising instructions that cause the machine to:
  re-position the three-dimensional model to produce a re-positioned three-dimensional model;
  detect silhouette edges on the re-positioned three-dimensional model based on the data, the silhouette edges comprising edges between front-facing and back-facing polygons in the three-dimensional model and edges on boundaries of the three-dimensional model that do not connect to a neighboring polygon; and
  render only the silhouette edges of the re-positioned three-dimensional model as edge segments to produce a silhouette image comprising a nonphotorealistic two-dimensional cartoon image.

46. An apparatus for rendering a two-dimensional cartoon image from data for a three-dimensional model, comprising:
  a memory which stores instructions; and
  a processor which executes the instructions to (i) position the three-dimensional model, (ii) detect silhouette edges on the three-dimensional model based on the data, the silhouette edges comprising edges between front-facing and back-facing polygons in the three-dimensional model, at least some of the silhouette edges being detected using data for both the front-facing and back-facing polygons, and (iii) render only the silhouette edges as edge segments to produce a silhouette image comprising a nonphotorealistic two-dimensional cartoon image.

47. The apparatus of claim 46, wherein:
  the data comprises normal vectors of polygons; and
  detecting comprises a vector computation with respect to the normal vectors.

48. The apparatus of claim 46, wherein
  the data comprises polygons that make up the three-dimensional model; and
  detecting a silhouette edge comprises:
    determining a first vector dot product of an eyepoint vector and a normal vector to a first polygon;

determining a second vector dot product of the eyepoint vector and a normal vector to a second polygon; and comparing signs of the first vector dot product and the second vector dot product.

49. The apparatus of claim 48, wherein a feature is a silhouette edge if the signs are different, and the feature is not a silhouette edge if the signs are the same.

50. The apparatus of claim 46, wherein a set of polygons comprises a mesh, and a silhouette edge comprises an edge of a polygon that is on a boundary of the mesh.

51. The apparatus of claim 50, wherein a silhouette edge at the boundary of the mesh comprises an edge that is not shared with an adjacent polygon.

52. The apparatus of claim 46, wherein the polygons comprise triangles.

53. The apparatus of claim 46, wherein rendering is performed using an edge list.

54. The apparatus of claim 53, wherein:

the data comprises polygons that make up the three-dimensional model; and detecting silhouette edges comprises:
  detecting edges of the polygons;
  storing coordinates of detected polygon edges in an edge list;
  determining which of the detected polygon edges are silhouette edges; and
  marking, in the edge list, detected polygon edges that are silhouette edges.

55. The apparatus of claim 54, wherein rendering comprises:

a retrieving marked edges from the edge list; and forming the non-photorealistic two-dimensional cartoon image based on the marked edges.

56. The apparatus of claim 46, wherein the processor executes instructions to:

render a skeletal structure of the three-dimensional model, the skeletal structure being internal to the cartoon image.

57. The apparatus of claim 46, wherein the processor executes instructions to:

re-position the three-dimensional model to produce a re-positioned three-dimensional model;

detect silhouette edges on the re-positioned three-dimensional model based on the data, the silhouette edges comprising edges between front-facing and back-facing polygons in the three-dimensional model and edges on boundaries of the three-dimensional model that do not connect to a neighboring polygon; and render only the silhouette edges of the re-positioned three-dimensional model as edge segments to produce a silhouette image comprising a nonphotorealistic two-dimensional cartoon image.

* * * * *